_United States Patent_ [19]

Suzuki et al.

[11] Patent Number: 4,492,869
[45] Date of Patent: Jan. 8, 1985

[54] RADIATION DETECTOR

[75] Inventors: Atsushi Suzuki, Higashiyamato; Hiromichi Yamada, Hino; Yoko Uchida, Kawasaki; Hideki Kohno; Minoru Yoshida, both of Tokyo, all of Japan

[73] Assignee: Hitachi Medical Corporation, Tokyo, Japan

[21] Appl. No.: 313,171

[22] Filed: Oct. 20, 1981

[30] Foreign Application Priority Data

Oct. 22, 1980 [JP] Japan .................................. 55-146891

[51] Int. Cl.³ .............................................. G01T 1/20
[52] U.S. Cl. ..................................... 250/367; 250/368; 250/486.1
[58] Field of Search ................... 250/367, 368, 486.1, 250/487.1, 488.1, 366

[56] References Cited

U.S. PATENT DOCUMENTS

| | | | |
|---|---|---|---|
| 2,956,162 | 10/1960 | Armistead | 250/368 |
| 3,504,212 | 3/1970 | Wollentin et al. | 250/487.1 |
| 3,793,519 | 2/1974 | Mallard et al. | 250/368 |
| 4,090,081 | 5/1978 | Takami et al. | 250/368 |
| 4,109,150 | 8/1978 | Martone et al. | 250/368 |
| 4,149,083 | 4/1979 | Suys et al. | 250/486.1 |
| 4,284,891 | 8/1981 | Pergrale et al. | 250/368 |
| 4,317,037 | 2/1982 | Suzuki et al. | 250/367 |

FOREIGN PATENT DOCUMENTS 851310 10/1960 United Kingdom ................ 250/368

_Primary Examiner_—Alfred E. Smith
_Assistant Examiner_—Carolyn E. Fields
_Attorney, Agent, or Firm_—Antonelli, Terry & Wands

[57] ABSTRACT

In a radiation detector having a radiation-stimulated light emitting scintillator and a photodetector for receiving the light emission from the scintillator, the scintillator is formed of a layer of phosphor particles and a light scattering layer is provided in an optical path between the phosphor particle layer and the photodetector. Light generated in the surface of the scintillator is scattered and absorbed by the light scattering layer in some degree so that the reduced quantity of light incident upon the photodetector lowers the output of the photodetector. This effect is balanced with the lowering of the photodetector output due to the absorption and scattering of light generated at the inner parts of the scintillator and further removes anisotropic light emission. As a result, signal-to-noise ratio is greatly improved.

A shielding layer between the scintillator and photodetector prevents secondary radiation such as scattered and fluorescent radiation from reaching the photodetector. The shielding layer can also serve as the scattering layer.

67 Claims, 7 Drawing Figures

RADIATION DETECTOR

BACKGROUND OF THE INVENTION

The present invention relates to a radiation detector for detecting radiation such as X-rays and γ-rays, and more particularly to a radiation detector suitable for use in an X-ray CT (computed tomography) or positron camera.

Various types of X-ray CT have been known. In a typical example thereof, a turntable member having an aperture at a central portion thereof is arranged vertically, and a body or target to be examined is placed at the center of the aperture provided in the turntable member. An X-ray source is mounted on a circumferential part of the turntable member. The X-rays emitted from the X-ray source travel fanwise, pass through the target to be examined, and are then detected by a radiation detecting means mounted on another circumferential part of the turntable member. The radiation detecting means includes an array of thirty to one-thousand radiation detectors which have the same performance and are arranged on an arc of a circle with center at the X-ray source. In the case where narrow or limited X-ray sector span is used, the detectors may be arranged on a straight line. The X-ray source and the radiation detecting means mounted on the turntable member are rotated about the target by rotating the turntable member about the center axis of the aperture, and the output of each radiation detector is measured every time the turntable member is rotated by a predetermined angle (for example, 1°). On the basis of the measured values, a cross sectional image of the target to be examined is reconstructed.

A gas chamber filled with Xenon or the combination of bismuth germanate (BGO) monocrystals and photomultipiers has hiterto been used as the radiation detecting means for the X-ray CT or the like. In these detecting means, it was not easy to make the respective characteristics of channels the same. Therefore, it was difficult to obtain an acceptable clear image. Specifically, in the combination of BGO monocrystals and photomultipliers, the fluctuation in the characteristics of the BGO monocrystals as a scintillator as well as the fluctuation in the characteristics of the photomultipiers resulted in a great difficulty of the provision of radiation detectors having the same characteristics.

In order to solve this problem, some of the present inventors have proposed a radiation detector using phosphor particles as a scintillator, in the Japanese Patent Application No. 77887/78 (corresponding to the U.S. Application Ser. No. 47133 filed on June 11, 1979 and the German Patent Application No. P2923324.7) on June 8, 1979. A radiation detector for X-ray CT usually has a width of 1 to 10 mm (preferably 1 to 3 mm) and a length of, for example, about 20 mm in order to obtain a high-accuracy sectional image. Accordingly, the number of phosphor particles included in one radiation detector is, for example, on the order of 300,000, though depending upon the particle size. The respective characteristics of phosphor particles may be slightly different. However, when the phosphor particles are used as one scintillator after sufficient mixing thereof, fluctuations in the characteristic of the scintillator are on the order of the reciprocal of the square root of the number of phosphor particles, that is, on the order of 0.01 percent, and therefore satisfactory results can be obtained.

An efficiently available light emission output generated through radiation stimulation from the phosphor particle scintillator includes light which is generated in a surface region of the scintillator and light which is generated at the inner parts of the scintillator and escape to the outside of the scintillator. The escape of light is difficult due to scattering in the scintillator. This internal scattering results in the substantial absorption of light energy, thereby lowering an externally available light output from the scincillator. Thus, it is desirable to use a phosphor material which has a high radiation absorption power and a high radiation-light conversion efficiency. Further, it is desirable to use a tilted or multi-layer scintillator in order to facilitate the escape of light.

However, the present inventors' experiments have revealed that a phosphor particle scintillator encounters a great fluctuation (hereinafter referred to as noise) in the outputs from the same scintillator over a number of measurements. Thus, even if the radiation-light conversion efficiency of a phosphor material or the degree of escape of internally generated light is enchanced to improve the light output from a scintillator, it was difficult to sufficiently improve the signal-to-noise (S/N) ratio.

SUMMARY OF THE INVENTION

An object of the present invention is to provide a radiation detector which has a high signal-to-noise ratio.

In a scintillator formed of phosphor particles, when light generated at the inner parts of the scintillator escapes to the outside thereof, the light has a long, zigzag travel path and hence the light output is decreased due to absorption. On the other hand, light generated in a surface region of the scintillator is scarcely subjected to scattering and therefore any decrease of the light output due to absorption almost never takes place. Thus, the decrease of light output due to absorption is different depending upon a portion of the scintillator where light is generated. This difference is considered to form a cause of noises. Further, the fact that the light generated by a phosphor particle in the surface region of the scintillator is scarcely scattered by other phosphor particles results in an anisotropic light emission. This anisotropy, too is considered to form another cause of noises.

In order to make small the non-uniformity in decrease of the light output and the anisotropy, a radiation detector according to the present invention includes a light scattering layer provided on an optical path between a phosphor particle scintillator and a photodetector. Light generated in a surface of the scintillator is subjected to scattering and absorption in some degree by the light scattering layer, and therefore the reduced quantity of light is incident upon the photo detector. This light reduction is balanced with the reduction of internally generated light including internal scattering and absorption thereof. As a result, noises can be greatly reduced.

A shielding layer between the scintillator and photodetector prevents secondary radiation such as scattered and fluorescent radiation from reaching the photodetector. The shielding layer can also serve as the scattering layer.

DESCRIPTION OF THE PREFERRED EMBODIMENTS

Figure 1:
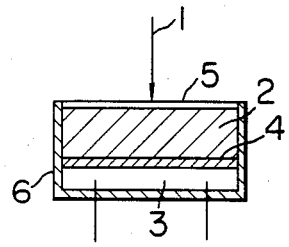
FIGS. 1, 2, 3, 4 and 5 are sectional views showing various embodiments of a radiation detector according to an aspect of the present invention.

Any layer capable of scattering light may be used as a light scattering layer used in the present invention. The light-scattering layer used in the present invention is preferable that it includes an interface (where refractive index varies) having a dimension of one-tenth to one hundred times the wavelength of light. The term "light" used herein indicates light in a broad sense, that is, includes not only a visible region but also a near visible region (such as a near ultraviolet wavelength of 3000 Å and a near infrared wavelength of 25000 Å). The light scattering layer is formed of, for example, powders of an appropriate material. In more detail, the appropriate material may be powders of at least one selected from a group consisting of $Al_2O_3$, $SiO_2$ and $B_2O_3$ each of which exhibits no radiation-stimulated light emitting ability, or may be particles of a phosphor material whose radiation-stimulated light emitting ability is less than that of a phosphor material forming a scintillator body. The light scattering layer may be also formed by a rough surface of an optical guide interposed between the scintillator and a photodetector. An alternative or additional optical guide formed of a plastic or quartz glass having a number of air bubbles therein may also serve as the light scattering layer.

The scintillator used in the present invention is formed of particles of any phosphor material which can absorb radiation and generate stimulated light. In general, $Y_2O_2S$, $La_2O_2S$, $Gd_2O_2S$, $Lu_2O_2S$, $LaOBr$, $BaFCl$, $BaFBr$ and $BaSO_4$ each of which is activated by at least one of Eu, Pr and Tb, are used. Further, (CdS: Cu, Al), (CdS: Ag, Cl), (ZnS: Cu, Al), $CaWO_4$ and $CdWO_4$ may be also used. Specifically, such materials as $Gd_2O_2S$ (Eu), $Gd_2O_2S$ (Pr) and $CdWO_4$ are preferable because of high X-ray absorption power and high radiation-light conversion efficiency. Phosphor materials such as $Gd_2O_2S$: Pr, F, Ce proposed by some of the present inventors in the Japanese Patent Application No. 54156/80 corresponding to the U.S. Application Ser. No. 257,426 filed on Apr. 24, 1981 and the German Patent Application No. P3116382.3 on Apr. 24, 1981, has a high radiation-light conversion efficiency and a short decay time, are advantageous in use for a radiation detector for X-ray CT.

Two or more of the above-mentioned phosphor materials may be mixed.

A variation in the characteristic of a radiation detector is small as the number of phosphor particles included in the phosphor particle layer is larger. The mean particle size of phosphor particles is preferably less than 200 μm, more preferably less than 100 μm. However, when the mean particle size is too small, the light output from the phosphor particle layer is decreased since the total surface area of the phosphor particles included in the phosphor particle layer increases. Therefore, the mean particle size is preferably more than 1 μm, more preferably more than 5 μm.

The phosphor particle layer is formed, for example, in the following manner. Let us consider phosphor particles $Gd_2O_2S$: Pr, F, Ce which can be prepared according to the above-referred Japanese Patent Application No. 54156/80. First, 100 g of this phosphor material having a mean particle size of 20 μm is sufficiently mixed with 15 cc of a polyvinyl alcohol aqueous solution to form a slurry. The slurry is applied into a vessel having a predetermined dimension and dried at 60° C. After the dried phosphor particle layer is removed out of the vessel, it is fixed to the bottom of the housing of a radiation detector by use of a substantially transparent adhesive (for example, an epoxy resin adhesive). A phosphor particle layer having a thickness of about 0.5 mm or less may be formed in such a manner that the slurry is directly applied into a recess with a predetermined depth formed in a cover portion of the housing of a radiation detector or in an optical guide. In the above explanation, the phosphor particles in the scintillator have the form of powders. However, the phosphor particles may be stiffened together with a substantially transparent material, for example, an epoxy resin or may be press-molded, thereby providing an integral scintillator. The press molding is disclosed in, for example, U.S. Pat. No. 4,242,221.

It is preferable to arrange the phosphor particle layer in a housing having a reflective inner surface. That is, the inner surface of the housing is preferably covered with an aluminum or silver layer which has a high reflectivity for visible and near visible rays. A photodetector or light detector may be arranged in the housing. However, the photodiode comprising the photodetector or light detector is usually placed outside the housing, and a light permeable window is provided at a part of the housing in order to lead light from the phosphor material to the photo detector through the window. Further, an optical guide may be provided between the phosphor particle layer and the photo diode to lead light from the phosphor material to the photo diode. The optical guide may be made of a substantially transparent material such as a plastic or quartz glass. The optical guide may be also provided by an empty space.

The housing is preferably coated with or made of a radiation shielding material such as brass, tungsten or lead, except a radiation receiving plane thereof. However, when an array of collimators are placed in front of an array of radiation detectors in a certain case of an X-ray CT, the radiation shielding material is not always required.

Various embodiments of the present invention will now be explained with reference to the drawings.

FIG. 1 is a sectional view showing an embodiment of a radiation detector according to the present invention. Referring to FIG. 1, a silicon photodiode 3 is placed on the bottom of a housing 6 made of brass. The inner surface of the housing 6 is coated with a film of aluminum to form a reflective surface. In the housing 6, a phosphor particle layer 2 having a thickness of 2 mm is arranged on the silicon photodiode 3. A light scattering layer 4 is formed on a surface of the phosphor particle layer 2 adjacent to or facing the photodiode 3. The light scattering layer 4 is made in such a manner that 2 g of $Al_2O_3$ powders having a mean particle size of 3 μm are mixed with 1 cc of a 2 percent polyvinyl alcohol aqueous solution to form a slurry and the slurry is thinly applied to the surface of the phosphor particle layer 2 (for example, at a thickness of 1 mg/cm²) and then dried. The housing 6 is closed with a cover 5 formed of a thin aluminum film. X-rays are incident upon the radiation detector in the direction as indicated with an arrow 1. The X-rays are generated by bombarding an electron beam having an energy of, for example, 120 KeV to a target. The greater part of incident X-rays are absorbed by the phosphor particle layer 2. The phosphor particle layer 2 is enclosed by the light reflective aluminum film, except that surface of the layer 2 facing the photodiode 3. Accordingly, light emission from the phosphor particle layer 2 is taken out of the above-mentioned surface. The light from the layer 2 is incident upon the silicon photodiode 3 through the light scattering layer 4 to be converted into an electric signal. The radiation detector having such a structure is about 20% smaller in signal output but about 5% greater in signal-to-noise ratio than a similar radiation detector having no light scattering layer.

In the present embodiment, a material such as $Al_2O_3$ exhibiting no radiation-stimulated light emitting ability has been used to form the light scattering layer. But, a phosphor material having a less radiation-stimulated light emitting ability than the scintillator forming phosphor material may be used. This is also applicable to other succeeding embodiments. For example, in the case where the scintillator body is formed of $Gd_2O_2S$: Pr, F, Ce, the light scattering layer may be formed of such a phosphor material as $CdWO_4$, $BaSO_4$: Eu, or $CdWO_4$: Pb. The phosphor particle layer acting as the light scattering layer can be formed in a manner similar to the phosphor particle layer acting as the scintillator body.

Figure 2:
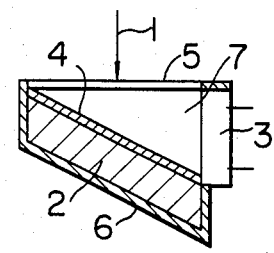

FIG. 2 is a sectional view showing another embodiment of a radiation detector according to the present invention. Referring to FIG. 2, a phosphor particle layer 2 (having a thickness of, for example, about 5 mm) is arranged in such a manner that a radiation receiving surface of the layer 2 is inclined by about 60° with respect to the direction 1 of incident radiation. Light emission from phosphor particles having absorbed X-rays may be unable to escape from the phosphor particle layer to the outside thereof when the phosphor particle layer is thick. In that case, it is preferable to tilt the radiation receiving surface of the phosphor particle layer with respect to the direction of incident radiation, as illustrated in the present embodiment. That is, when the radiation receiving surface is tilted by 60° with respect to the direction of incident radiation, the actual or effective depth of the phosphor particle layer in the direction of incident X-rays is about 1.15 times as large as the thickness of the phosphor particle layer in the direction perpendicular to the radiation receiving surface, and therefore the amount of absorption of X-rays by the phosphor particle layer is correspondingly increased. This means that a thin phosphor particle layer can be used in order to absorb the same amount of X-rays. Light generated in such a thin layer can readily escape to the outside, and therefore the light output is increased. The tilt angle is preferably in a range from 10° to 80°, more preferably from 30° to 60°.

In the present embodiment, the phosphor particle layer 2 is made somewhat thick, that is, has a thickness of, for example, 5 mm, for the following reason. Though sufficient absorption of X-rays can be achieved by a thickness portion of the thick layer 2 corresponding to about 2 mm, the remaining portion of the layer 2 functions to reflect upwardly (or toward the radiation receiving surface) the generated light so that it easily reaches the radiation receiving surface.

In the present embodiment, the phosphor particle layer 2 is placed on the bottom of the housing and light emission from the layer 2 is taken out of the layer 2 at the radiation receiving surface thereof. This arrangement is advantageous since the incident radiation is absorbed most strongly in the radiation receiving surface of the phosphor particle layer 2. A light scattering layer 4 is formed on the radiation receiving surface of the phosphor particle layer 2 in a manner similar to in the embodiment shown in FIG. 1. A photodetector 3 is mounted on a light permeable window, provided in the side surface of the housing 6. This arrangement of the photodetector in parallel to the direction of incident radiation is preferable since the light receiving surface of the photodetector is deviated from the direct path of incident radiation and hence the signal-to-noise ratio is improved. When the light receiving surface of the photodetector is otherwise placed in the direct path of incident radiation, the photodetector may respond to the incident radiation having passed through the phosphor particle layer, thereby deteriorating the performance and efficiency of the photodetector. In the radiation detector having the structure shown in FIG. 2, light emission from the phosphor particle layer 2 passes through the light scattering layer 4 formed on the radiation receiving surface of the layer 2, further passes through a space 7 acting as an optical guide, and is then incident upon the silicon photodiode 3 to be converted into an electric signal. In the present embodiment, since the light scattering layer 4 is formed on the radiation receiving surface where light emission from the phosphor particle layer is the greatest, the light scattering layer remarkably contributes to the improvement on signal-to-noise ratio. The present embodiment is about 20 percent higher in signal-to-noise ratio than a similar radiation detector having no light scattering layer.

In a radiation detector such as X-ray CT, 10 to 1000 radiation detectors each having the structure shown in FIG. 2 are arranged in the direction perpendicular to the drawing.

Figure 3:
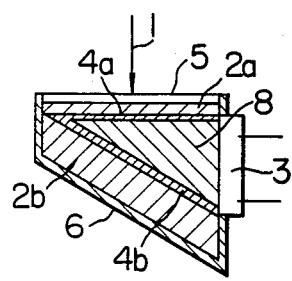

FIG. 3 is a sectional view showing a further embodiment of a radiation detector according to the present invention. The embodiment shown in FIG. 3 is an improved version of the embodiment shown in FIG. 2, and is an example of a radiation detector including a scintillator of two-layer structure and an optical guide. Referring to FIG. 3, an upper phosphor particle layer 2a having a thickness of, for example, 0.3 mm is formed on the lower surface of a housing cover 5, and a lower phosphor particle layer 2b having a thickness of, for example, 5 mm placed on the bottom of a housing 6 is tilted with respect to the direction of incident radiation as in FIG. 2. In the scintillator made up of the two phosphor particle layers 2a and 2b, light generated in each of the layers 2a and 2b can readily reach its surface, and therefore light output from the scintillator is further increased. An optical guide 8 made of a transparent acrylic resin is interposed between the phosphor particle layers 2a and 2b. Light scattering layers 4a and 4b are provided between the optical guide 8 and the phosphor particle layer 2a and between the optical guide 8 and the phosphor particle layer 2b, respectively. The light scattering layers 4a and 4b may be formed of the same powders or particles as mentioned previously. Alternatively, each of those surfaces of the optical guide 8 which are kept in contact with the phosphor particle layers 2a and 2b respectively, is ground to form a rough surface which may be used as the light-scattering layer. In the present embodiment, each of the surfaces 4a and 4b of the optical guide 8 is ground with alumina powders having a mean particle size of 3 μm to provide a rough surface. In a radiation detector having the structure shown in FIG. 3, a part of X-rays incident upon the detector in the direction as indicated with an arrow 1 are absorbed by the phosphor particle layer 2a while the remaining X-rays having passed through the layer 2a reach through the optical guide 8 the phosphor particle layer 2b where they are almost absorbed. Light emission from the layer 2a is incident on a photo detector 3 through the light scattering layer 4a and the optical guide 8 while light emission from the layer 2b is incident on the photo detector 3 through the light scattering layer 4b and the optical guide 8. The embodiment shown in FIG. 3 is about 20 percent higher in signal-to-noise ratio than a similar radiation detector having no light scattering layer.

Though the rough surface of the optical guide has been used as the light scattering layer in the present embodiment, an optical guide made of a plastic material or quartz glass containing a number of air bubbles may be used as the light scattering layer.

The scintillator may emit X-rays scattered by particles in the scintillator and fluorescent X-rays generated secondarily due to the photoelectric effect, in addition to light generated through the excitation by absorbed X-rays. Since a photodetector such as the silicon photodiode responds to both light and X-rays, a part of scattered and/or fluorescent X-rays ((hereinafter referred to as secondary radiation) emitted from the scintillator can be detected by the photodetector, thereby forming a noise component. In more detail, the silicon photodiode cannot always detect the secondary radiation. That is, the secondary radiation is detected at a time but is not detect at another time. Accordingly, the output of the photodiode fluctuates, thereby producing noises. In order to obtain a radiation detector having a high signal-to-noise ratio, it is required to take into consideration the secondary radiation which may provide a noise source. In order to remove the secondary radiation induced noises, in the optical path between the scintillator and the photodetector, there is provided a layer having a low radiation permeability (hereinafter referred to as secondary radiation shielding layer) for preventing the secondary radiation from being incident upon the photodetector. It is preferable that the secondary radiation shielding layer has a high permeability for light from the scintillator so that the quantity of light generated from the scintillator and reaching the photodetector is not reduced.

Figure 4:
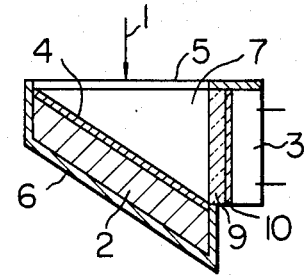
Figure 5:
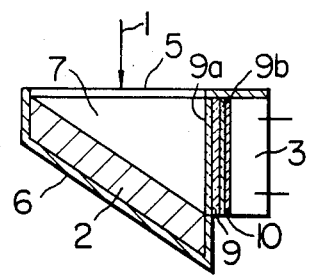

FIGS. 4 and 5 show two embodiments of a radiation detector, in which secondary radiation such as scattered X-rays and fluorescent X-rays are prevented from being incident upon a photodetector. The embodiment shown in FIG. 4 is constructed by adding a secondary radiation shielding layer 9 to the embodiment shown in FIG. 2. The secondary radiation shielding layer 9 may be made of either a material such as lead glass exhibiting no radiation-stimulated light emitting ability or a material such as bismuth germanate ($Bi_4Ge_3O_{12}$) exhibiting a radiation-stimulated light emitting ability. The layer 9 is required to have a thickness capable of sufficiently absorbing the secondary radiation. The thickness of the layer 9 depending upon the wavelength of secondary radiation included and the material of the layer 9 used is usually in a range from 0.5 to 2 mm. In the embodiment shown in FIG. 4, the secondary radiation shielding layer 9 is formed of a lead glass layer having a thickness of, for example, 1 mm. The lead glass layer is provided on the light receiving surface of the photodetector 3 through silicone grease 10. Since the shielding layer 9 absorbs radiation, it is desirable to arrange the shielding layer 9, as shown in FIG. 4, at a position deviated from the direct path of incident radiation toward the scintillator 2. In the shown embodiment, light emission from the scintillator 2 scattered X-rays and fluorescent X-rays pass through the light scattering layer 4 and the space 7, and are then incident upon the secondary radiation shielding layer 9. The light incident on the layer 9 passes through the shielding layer 9 and then impinges on the photo detector 3 to be converted into an electric signal while the scattered X-rays and fluorescent X-rays are absorbed by the shielding layer 9 and therefore are prevented from reaching the photodetector 3. The embodiment shown in FIG. 4 is 15 percent higher in signal-to-noise ratio than the embodiment shown in FIG. 2 provided with no secondary radiation shielding layer.

The embodiment shown in FIG. 5 is an example of a radiation detector in which a secondary radiation shielding layer 9 also serves as a light scattering layer. The secondary radiation shielding layer 9 is formed of a monocrystalline BGO (namely, $Bi_4Ge_3O_{12}$) layer having a thickness of, for example, 0.5 mm. At least a surface 9a of the BGO layer facing a phosphor layer 2, is ground with alumina powders having a mean particle size of 3 μm to provide a rough surface which serves a light-scattering layer. In the shown embodiment, another surface 9b of the BGO layer 9 facing a photodetector 3 is also made rough for the following reason. Light in the BGO layer 9 is hard to escape to the outside because of a high refractive index of BGO. The rough surface 9b is provided in order to facilitate the escape of light to the outside, thereby making the quantity of light incident upon the photodetector as large as possible. In the embodiment shown in FIG. 5, light from the scintillator 2 passes through a space 7, and is then scattered by the rough surface 9a of the BGO layer 9. The scattered light is incident upon the photodetector 3 through the BGO layer 9 and a silicone grease layer 10. On the other hand, scattered X-rays and fluorescent X-rays from the scintillator 2 are absorbed by the BGO layer 9 to be converted into light. The light thus obtained is also incident upon the photodetector 3 through the silicone grease 10. The present embodiment has substantially the same signal-to-noise ratio as the embodiment shown in FIG. 4. In the present embodiment, the monocrystalline phosphor material layer having a rough surface has been employed to scatter light from the scintillator and to prevent secondary radiation from the scintillator from impinging upon the photodetector. For the same purpose, there may be used a lead glass layer having a rough surface, a lead glass layer containing a trace of Pr, or a phosphor particle layer. The light scattering and secondary radiation shielding phosphor material layer is not limited to include a phosphor material whose radiation-stimulated light emitting ability is less than that of the scintillator forming phosphor material, but it is desirable to arrange such a layer at a position deviated from the direct path of incident radiation toward the scintillator.

Figure 6:
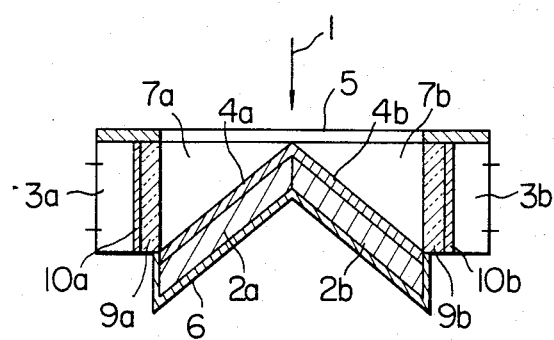
FIGS. 6 and 7 are sectional views showing different embodiments of a radiation detector according to another aspect of the present invention.
Figure 7:
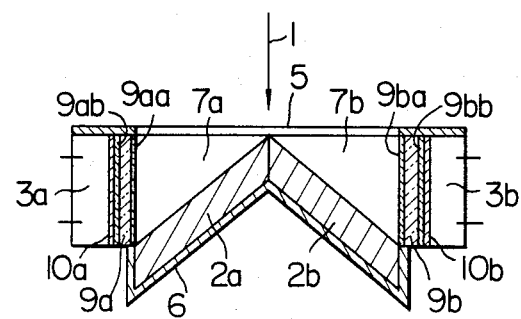

FIGS. 6 and 7 are sectional views showing still further embodiments of a radiation detector according to the present invention. These embodiments are improved versions of the embodiments shown in FIGS. 4 and 5, and include a phosphor particle layer having the form of a chevron, which is formed by combining two tilted phosphor particle layers. Each of the embodiments shown in FIGS. 6 and 7 has opposed silicon photodiodes 3a and 3b. The radiation receiving surface of each of phosphor particle layers 2a and 2b is tilted by about 60° with respect to the direction of incident radiation. In FIGS. 6 and 7, reference numerals 4a and 4b designate light scattering layers, numerals 7a and 7b spaces, numerals 9a and 9b lead glass layers, numerals 9aa and 9ab rough surfaces of the layer 9a, numerals 9ba and 9bb rough surfaces of the layer 9b, and numerals 10a and 10b silicone grease. In the radiation detectors shown in FIGS. 4 and 5, a ratio of the quantity of light incident upon the silicon photodiode 3 to the quantity of light emitted from the scintillator 2 is decreased as the width (namely, the length in the direction perpendicular to the drawing) of the aperture of radiation detector is smaller. In the radiation detector including the chevron shaped phosphor particle layer shown in FIG. 6 or 7, such a decrease in output is small as compared with the radiation detectors shown in FIGS. 4 and 5. For example, in the case where the radiation detectors shown in FIGS. 4 and 6 have the same aperture width of 1.5 mm and the same area of radiation receiving surface, the output of the detector shown in FIG. 6 is about 30 percent higher than that of the detector shown in FIG. 4. This effect is large as the width of the aperture is smaller. Accordingly, the structures shown in FIGS. 6 and 7 are advantageous when a multi-element detecting mean is formed. The above-mentioned effect is considered to be based upon the following facts. The embodiments shown in FIGS. 6 and 7 are small in area of the inner surface of vessel as compared with the detectors shown in FIGS. 4 and 5. Accordingly, when light emitted from the phosphor particle layers 2a and 2b travels till the silicon photodiodes 3a and 3b, the light is reflected from the inner wall of vessel a smaller number of times as compared with each of the embodiments shown in FIGS. 4 and 5. Thus, the light loss in the detector is small.

In the embodiments shown in FIGS. 6 and 7, the angle between the radiation receiving surface of each phosphor particle layer and the direction of incident radiation is preferably in a range from 10° to 80°, more preferably from 30° to 60°.

As mentioned above, a radiation detector according to the present invention can measure with a high signal-to-noise ratio a distribution of radiation having passed through a body to be examined.

We claim:

1. A radiation detector comprising:
a housing having a window for introducing radiation therethrough from one direction;
a scintillator disposed within said housing, said scintillator including a layer of phosphor particles which emit radiation-stimulated light therefrom upon impingement of said radiation thereon;
a secondary radiation shielding layer disposed in a face of said housing located at a position deviated from a path of transmission of said radiation, said secondary radiation shielding layer being made of a material which has a high permeability with respect to the radiation-stimulated light emitted from said phosphor particle layer and a low permeability with respect to secondary radiation from said phosphor particle layer; and
a light detector for receiving the radiation-stimulated light emitted from said phosphor particle layer through said secondary radiation shielding layer.

2. A radiation detector according to claim 1, wherein said secondary radiation shielding layer is formed of lead glass.

3. A radiation detector according to claim 1, wherein said secondary radiation shielding layer is formed of a monocrystalline phosphor material.

4. A radiation detector according to claim 1, wherein said secondary radiation shielding layer is formed of a monocrystalline layer of $Bi_4Ge_3O_{12}$.

5. A radiation detector according to claim 4, wherein said opposite faces of said monocrystalline layer have rough surfaces, respectively.

6. A radiation detector according to claim 1, wherein a face of said secondary radiation shielding layer, to which the radiation-stimulated light emitted from said phosphor particle layer is incident, has a rough surface.

7. A radiation detector according to claim 1, wherein said secondary radiation shielding layer is formed of lead glass containing Pr.

8. A radiation detector according to claim 1, wherein said secondary radiation shielding layer is formed of a layer of phosphor particles.

9. A radiation detector according to claim 1, including a light scattering layer disposed between said phosphor particle layer and said light detector.

10. A radiation detector according to claim 9, wherein a face of said secondary radiation shielding layer, to which the radiation-stimulated light emitted from said phosphor particle layer is incident, has a rough surface, said secondary radiation shielding layer with said rough surface serving as said light scattering layer.

11. A radiation detector according to claim 9, wherein said secondary radiation shielding layer is formed of lead glass containing Pr, said lead glass layer serving as said light scattering layer.

12. A radiation detector according to claim 9, wherein said opposite faces of said secondary radiation shielding layer are formed of a monocrystalline layer of $Bi_4Ge_4O_{12}$, having rough surfaces respectively, said monocrystalline layer serving as said light scattering layer.

13. A radiation detector according to claim 9, wherein said secondary radiation shielding layer is formed of a layer of phosphor particles, said layer of phosphor particles serving as said light scattering layer.

14. A radiation detector comprising:
a housing having multiple sides including a front face and a pair of side faces, said housing provided with a window in the front face for introducing radiation therethrough into said housing;
a scintillator disposed within said housing, said scintillator including a layer of phosphor particles which is raised at a central portion thereof and is tilted toward the pair of side faces of said housing, said phosphor particle layer emitting radiation-stimulated light therefrom upon impingement of said radiation thereon;
first and second secondary radiation shielding layers disposed in the pair of side faces of said housing respectively, each of said first and second secondary radiation shielding layers being made of a material which has a high permeability with respect to the radiation-stimulated light emitted from said phosphor particle layer and a low permeability with respect to secondary radiation from said phosphor particle layer; and first and second light detectors for receiving the radiation-stimulated light emitted from said phosphor particle layer through said first and second secondary radiation shielding layers, respectively.

15. A radiation detector according to claim 14, wherein each of said first and second secondary radiation shielding layers is formed of lead glass.

16. A radiation detector according to claim 14, wherein each of said first and second secondary radiation shielding layers is formed of a monocrystalline phosphor material.

17. A radiation detector according to claim 14, wherein each of said first and second secondary radiation shielding layers is formed of a monocrystalline layer of $Bi_4Ge_3O_{12}$.

18. A radiation detector according to claim 17, wherein opposite faces of said monocrystalline layer have rough surfaces, respectively.

19. A radiation detector according to claim 14, wherein said phosphor particle layer is tilted at an angle of 10° to 80° with respect to a predetermined radiation incident direction.

20. A radiation detector according to claim 14, wherein said phosphor particle layer is tilted at an angle of 20° to 60° with respect to a predetermined radiation incident direction.

21. A radiation detector according to claim 14, wherein a face of each of said first and second secondary radiation shielding layers, to which the light emission from said phosphor particle layer is incident, has a rough surface.

22. A radiation detector according to claim 14, wherein each of said first and second secondary radiation shielding layers is formed of lead glass containing Pr.

23. A radiation detector according to claim 14, wherein each of said first and second secondary radiation shielding layers is formed of a layer of phosphor particles.

24. A radiation detector according to claim 14, including a first and second light scattering layer disposed between said phosphor particle layer and said first and second light detectors.

25. A radiation detector according to claim 24, wherein a face of each of said first and second secondary radiation shielding layers, to which the light emission from said phosphor particle layer is incident, has a rough surface, said first and second secondary radiation shielding layers serving as said first and second light scattering layers, respectively.

26. A radiation detector according to claim 24, wherein each of said first and second secondary radiation shielding layers is formed of lead glass containing Pr, said first and second lead glass layers serving as said first and second light-scattering layers, respectively.

27. A radiation detector according to claim 24, wherein opposite faces of said first and second secondary radiation shielding layers are formed of a monocrystalline layer of $Bi_4Ge_3O_{12}$ having rough surfaces respectively, said first and second monocrystalline layers serving as said first and second light-scattering layers, respectively.

28. A radiation detector according to claim 24, wherein each of said first and second secondary radiation shielding layers is formed of a layer of phosphor particles, said first and second layer of phosphor particles serving as said first and second light-scattering layers, respectively.

29. A radiation detector comprising:

a housing having at least a first side, a second side and a third side;

a radiation permeable window along said first side for introducing radiation therethrough into said housing;

a scintillator disposed in said housing along said second side and positioned so that said radiation introduced through said radiation permeable window is incident thereon, said scintillator including a layer of phosphor particles which emit radiation-stimulated light therefrom upon impingement of said radiation thereon;

a secondary radiation shielding layer disposed along said third side of said housing and arranged at a position deviated from the direct path of said radiation introduced through said radiation permeable window and incident on said scintillator, said secondary radiation shielding layer being made of a material which has a high permeability with respect to radiation-stimulated light emitted from said phosphor particle layer and low permeability with respect to secondary radiation, and said secondary radiation shielding layer is disposed so that said radiation-stimulated light emitted from said phosphor particle layer is incident thereon; and a photodetector for receiving said radiation-stimulated light emitted from said phosphor particle layer is disposed adjacent to said secondary radiation shielding layer, whereby said secondary radiation shielding layer is interposed between said photodetector and both of said radiation-stimulated light and secondary radiation.

30. A radiation detector according to claim 29, wherein said secondary radiation shielding layer is formed of lead glass.

31. A radiation detector according to claim 29, wherein said secondary radiation shielding layer is formed of a monocrystalline phosphor material.

32. A radiation detector according to claim 29, wherein said secondary radiation shielding layer is formed of a monocrystalline layer of $Bi_4Ge_3O_{12}$.

33. A radiation detector according to claim 29, wherein the housing is coated with, or made of, a radiation shielding material.

34. A radiation detector according to claim 33, wherein said radiation shielding material is lead.

35. A radiation detector according to claim 29, wherein said phosphor particle layer of said scintillator is arranged in such a manner that a radiation receiving surface of said phosphor particle layer is inclined with respect to the direction of the incident radiation introduced through said radiation permeable window.

36. A radiation detector according to claim 35, wherein the angle of inclination is in a range from 10° to 80°.

37. A radiation detector according to claim 35, wherein the angle of inclination is in a range from 30° to 60°.

38. A radiation detector according to claim 29, including a light scattering layer disposed between said phosphor particle layer and said photodetector.

39. A radiation detector according to claim 38, wherein a face of said secondary radiation shielding layer to which the radiation-stimulated light emitted from said phosphor particle layer is incident, has a rough surface, said secondary radiation shielding layer serving as said light scattering layer.

40. A radiation detector according to claim 38, wherein said secondary radiation shielding layer is formed of lead glass containing Pr, said lead glass layer serving as said light scattering layer.

41. A radiation detector according to claim 38, wherein opposite faces of said secondary radiation shielding layer are formed of a monocrystalline layer of $Bi_4Ge_3O_{12}$, having rough surfaces respectively, said monocrystalline layer serving as a light scattering layer.

42. A radiation detector according to claim 38, wherein said secondary radiation shielding layer is formed of a layer of phosphor particles, said layer of phosphor particles serving as a light scattering layer.

43. A radiation detector according to claim 38, wherein said light scattering layer is formed of powders of at least one selected from a group consisting of $Al_2O_3$, $SiO_3$ and $B_2O_3$.

44. A radiation detector according to claim 38, wherein an optical guide having a rough surface adjacent to said phosphor particle layer is provided on an optical path disposed between said phosphor particle layer and said photodetector, whereby said rough surface serves as said light scattering layer.

45. A radiation detector according to claim 38, wherein said light scattering layer is an optical guide having a number of air bubbles therein.

46. A radiation detector according to claim 38, wherein said light scattering layer is formed of phosphor particles whose radiation-stimulating light emitting ability is smaller than that of the phosphor particles of said phosphor particle layer.

47. A radiation detector according to claim 46, wherein the phosphor particles of said light scattering layer are selected from a group consisting of $CdWO_4$, $BaSO_4$:Em and $CdWO_4$:Pb.

48. A radiation detector according to claim 38, wherein said light scattering layer is in close contact with said phosphor particle layer.

49. A radiation detector comprising:
a housing having at least a first side, a second side, a third side and a fourth side;
a radiation permeable window is along said first side for introducing radiation therethrough into said housing;
a scintillator disposed in said housing opposite said radiation permeable window along said second side and positioned so that said radiation introduced through said radiation permeable window is incident thereon, said scintillator including a layer of phosphor particles which emit radiation-stimulated light therefrom upon impingement of said radiation thereon, and said scintillator is formed in the shape of an angle by the combining of two inclined phosphor particle layers wherein the vertex of the phosphor particle layer angle is in contact with said radiation permeable window;
a first secondary radiation shielding layer disposed along said third side of said housing and opposite a second secondary radiation shielding layer which is disposed along a fourth side, said phosphor particle layer angle is disposed between said first and second secondary radiation shielding layers, said first and second secondary radiation shielding layers are arranged at a position deviated from the direct path of said radiation introduced through said radiation permeable window and incident on said scintillator, said first and second secondary radiation shielding layers being made of a material which has a high permeability with respect to said radiation-stimulated light emitted from said phosphor particle layer and low permeability with respect to secondary radiation, and said first and second secondary radiation shielding layers are disposed so that said radiation-stimulated light emitted from said phosphor particle layer is incident thereon; and
a first and second photodetector for receiving said radiation stimulated light emitted from said phosphor particle layer are disposed adjacent to said first and second secondary radiation shielding layers, respectively, whereby said first and second secondary radiation shielding layers are interposed between said first and second photodetectors and both of said radiation-stimulated light and said secondary radiation.

50. A radiation detector according to claim 49, wherein each of said first and second secondary radiation shielding layers is formed of lead glass.

51. A radiation detector according to claim 49, wherein each of said first and second secondary radiation shielding layers is formed of a monocrystalline phosphor material.

52. A radiation detector according to claim 49, wherein each of said first and second secondary radiation shielding layers is formed of a monocrystalline layer of $Bi_4Ge_3O_{12}$.

53. A radiation detector according to claim 49, wherein said phosphor particle layer is tilted at an angle of 10° to 80° with respect to a predetermined radiation incident direction.

54. A radiation detector according to claim 49, wherein said phosphor particle layer is tilted at an angle of 30° to 60° with respect to a predetermined radiation incident direction.

55. A radiation detector according to claim 49, including a first and second light scattering layer disposed between said phosphor particle layer and said first and second photodetectors, respectively.

56. A radiation detector according to claim 55, wherein a face of each of said first and second secondary radiation shielding layers to which the light emission from said phosphor particle layer is incident, has a rough surface, said first and second secondary radiation shielding layers serving as said first and second light scattering layers, respectively.

57. A radiation detector according to claim 55, wherein each of said first and second secondary radiation shielding layers is formed of lead glass containing Pr, said first and second lead glass layers serving as said first and second light scattering layers, respectively.

58. A radiation detector according to claim 55, wherein opposite faces of said first and second secondary radiation shielding layers are formed of $Bi_4Ge_3O_{12}$ having rough surfaces, respectively, said first and second monocrystalline layers serving as said first and second light scattering layers, respectively.

59. A radiation detector according to claim 55, wherein each of said first and second secondary radiation shielding layers is formed of a layer of phosphor particles, said first and second layers of phosphor particles serving as said first and second light scattering layers, respectively.

60. A radiation detector according to claim 55, wherein said first and second light scattering layers are formed of powders of at least one selected from a group consisting of $Al_2O_3$, $SiO_3$ and $B_2O_3$.

61. A radiation detector according to claim 55, wherein a first and second optical guide, each having a rough surface adjacent to a first and second optical path disposed between said phosphor particle layer and said first and second photodetectors, respectively, whereby said rough surface serves as said first and second light scattering layers, respectively.

62. A radiation detector according to claim 55, wherein said first and second light scattering layers are optical guides having air bubbles therein.

63. A radiation detector according to claim 55, wherein said first and second light scattering layers are formed of phosphor particles whose radiation-stimulating light emitting ability is smaller than that of the phosphor particles of said phosphor particle layer.

64. A radiation detector according to claim 63, wherein the phosphor particles of said first and second light scattering layer are powders of at least one selected from a group consisting of $CdWO_4$, $BaSO_4$:Eu, and $CdWO_4$:Pb.

65. A radiation detector according to claim 55, wherein said first and second light scattering layer are in close contact with said phosphor particle layer.

66. A radiation detector according to claim 55, wherein said housing is coated with or made of a radiation shielding material.

67. A radiation detector according to claim 66, wherein said radiation shielding material is lead.

* * * * *